Figure 1:
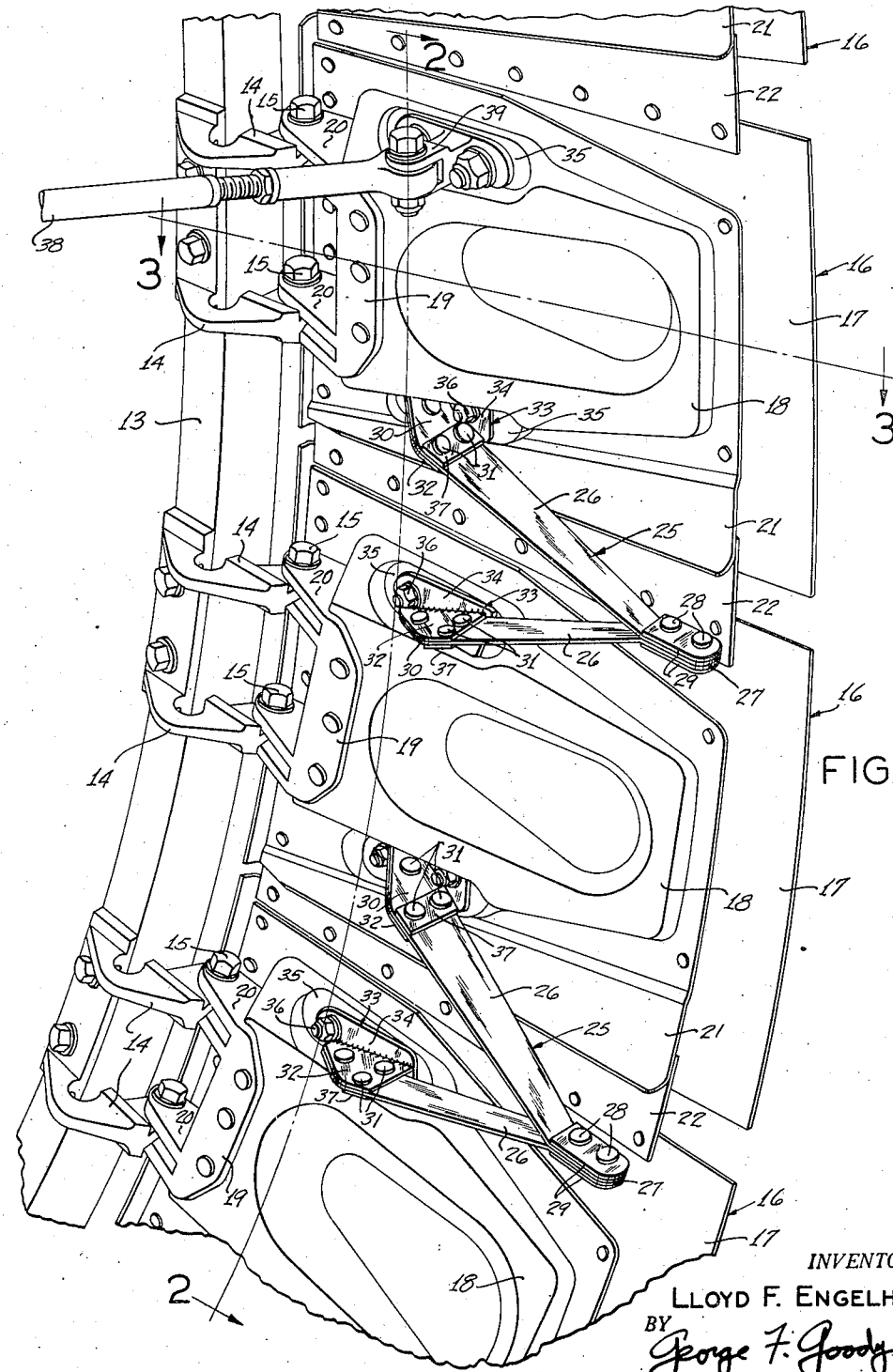

Dec. 7, 1948.  L. F. ENGELHARDT  2,455,858
COWL FLAP OPERATING MECHANISM
Filed June 25, 1945  2 Sheets-Sheet 1

INVENTOR.
LLOYD F. ENGELHARDT
BY George F. Goodyear
ATTORNEY

Dec. 7, 1948.  L. F. ENGELHARDT  2,455,858
COWL FLAP OPERATING MECHANISM
Filed June 25, 1945  2 Sheets-Sheet 2
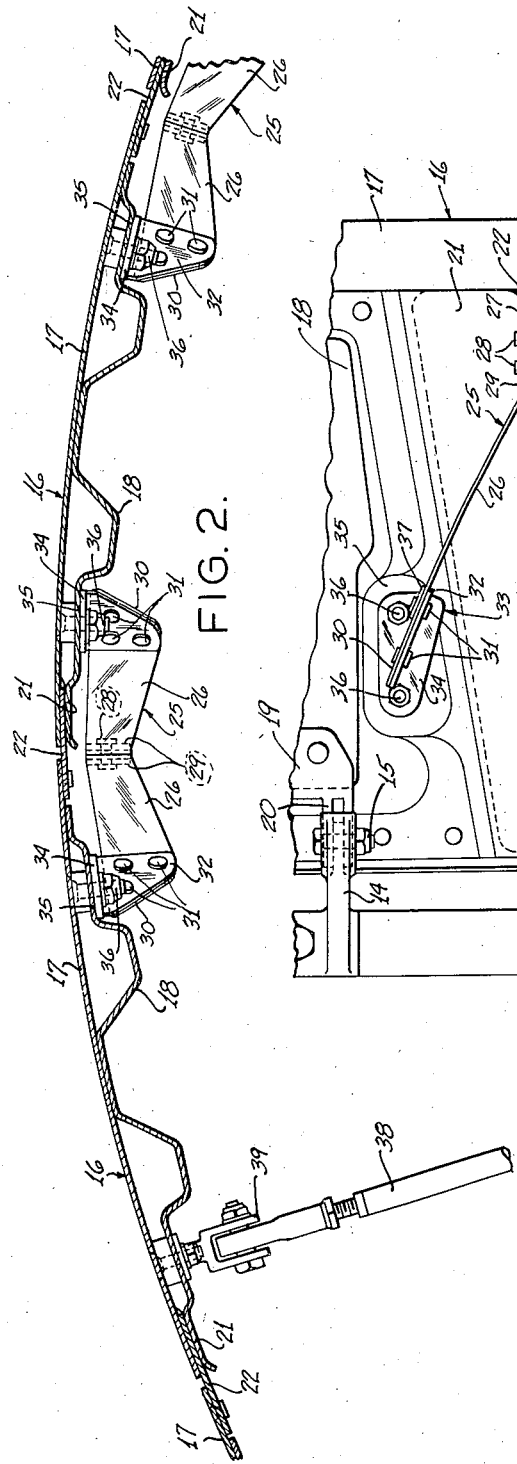
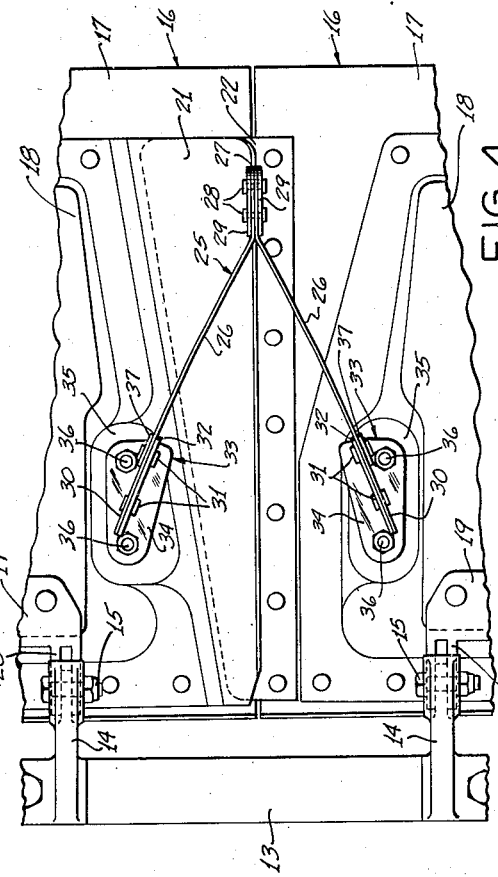
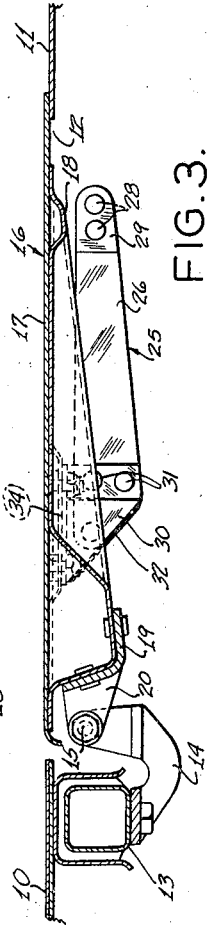
INVENTOR.
LLOYD F. ENGELHARDT
BY George F. Goodyear
ATTORNEY

Patented Dec. 7, 1948

2,455,858

UNITED STATES PATENT OFFICE 2,455,858

COWL FLAP OPERATING MECHANISM

Lloyd F. Engelhardt, Ferguson, Mo., assignor to Curtiss-Wright Corporation, a corporation of Delaware Application June 25, 1945, Serial No. 601,526

7 Claims. (Cl. 268—96)

This invention relates to aircraft engine cowl flaps and more particularly to an improved connecting means for operatively interconnecting adjacent flaps to assure simultaneous movement thereof.

In radial aircraft engines, hinged cowl flaps have customarily been provided to regulate the amount of cooling air passing through the engine. Flaps heretofore used have been interconnected by means of brackets and connecting links movably attached to the flaps and cowl, with suitable means for actuating the flaps by one or more control connections. If the control connection becomes disengaged the flaps would be free to open or close and thereby interfere with the proper cooling of the engine.

It is therefore an object of the present invention to provide an improved connecting means for engine cowl flaps which is extremely simple in construction, light in weight and free of moving parts or pivoted joints. Another object is to provide a cowl flap connecting means which will permit angular movement of adjacent flaps having their hinge axes angularly disposed in relation to each other, and yet is of such rigidity as to cause simultaneous angular movement of adjacent flaps when any flap is moved by other means. A further object is to provide a cowl flap connecting and actuating means so arranged that the flaps will be moved to a partially open position when the primary flap operating means is inoperative. A still further object is to provide a cowl flap connecting means which will prevent overheating of the engine when the primary flap actuating means fails or becomes disconnected with the flaps in their closed position.

Other objects and advantages will be apparent from the following detailed description and accompanying drawing, in which: Figure 1 is a perspective view illustrating the improved flap connecting means as applied to a cowl flap assembly and as viewed from the interior of an engine cowl installation; Figure 2 is a transverse sectional view taken on line 2—2 of Figure 1; Figure 3 is a sectional view taken longitudinally of a flap and as viewed along line 3—3 of Figure 1; and Figure 4 is a plan view of portions of adjacent flaps with the connecting means of this invention operatively attached thereto.

The present invention is shown as applied to an engine cowl which comprises a forward cowl section 10 surrounding an engine (not shown) in the usual manner and spaced longitudinally from an aft cowl section 11 to provide an engine cooling air outlet 12 (shown closed in Figure 3).

Located at the aft end of cowl section 10 is the usual cowl ring 13 having fixed thereto in spaced relation a plurality of hinge fittings 14 to which are pivotally secured, as by bolts 15, a plurality of flaps, generally indicated at 16. Each flap 16 comprises a skin or outer section 17 and a formed stiffening inner section 18 suitably spotwelded together in assembly to form a light weight, rigid flap unit. Suitably fastened to the forward portion of the formed section 18 of each flap is a fitting 19 having forwardly projecting clevis portions 20 for pivotal engagement with the cowl hinge fitting 14. One side portion of the inner formed section 18 is joggled inwardly from the skin portion, as at 21, to provide a space for receiving therebetween one edge of a seal strip 22, the opposite edge of which is secured to an edge portion of an adjacent flap 16.

The above described cowl and flap structure is of a relatively common type and is utilized to regulate the flow of air past the engine for cooling purposes. Such regulation is effected by swinging or angularly positioning the flaps about the axis of hinges 14 to control the amount of exit air passing through the cowl opening 12.

It will be noted that the flaps 16 are positioned around the circular or curved cowl 10 on hinge axes which are disposed in chords of the transverse cowl curve. With this relation of parts it will be apparent that any connection between adjacent flaps must allow for lateral relative movement of the flaps when the same are moved angularly about their hinge axes for cooling air control. It has been the practice to operatively connect the several flaps by pivoted links and levers to assure simultaneous swinging movement of the adjacent flaps. Such prior connecting mechanisms are heavy, difficult to fabricate for proper operation and produce maintenance problems due to wear in the pivoted connections.

A connecting means overcoming the above mentioned faults of prior connections yet satisfying all the requirements for such connections is indicated generally at 25 and shown to good advantage in Figure 1. The connecting means 25 comprises diverging resilient arms 26 constructed of spring steel and secured together at their inner mating ends 27 by rivets 28. Plate elements 29 overlying the ends 27 prevent flexing of the arm at the inner rivet joint which flexing would normally cause failure of the arm at the rivet hole. To the outer end 30 of each arm 26 is secured, as by rivets 31, an upstanding plate portion 32 of a T-shaped mounting bracket 33. The base plate 34 of the bracket 33 is secured to the flat formed portion 35 of the flap by bolts 36 as clearly shown in Figure 2 and 4. A washer element 37 overlying the spring arm end 30 prevents flexing of the arm at the rivet attachment.

A primary operating means is shown in the form of a rod 38 pivotally connected to a fitting 39 secured to the flat portion 35 of one of the flaps 16, and in this location replaces one of the fittings 25. An operating rod 38 may be attached to any one or more than one of the individual flaps. The motion transmitted to the flap by this rod will be transmitted to the other flaps by the novel connecting means 25 which preferably operatively connect all the flaps. It will be seen that any combination of primary operating connections and the connectors 25 of this invention may be made to suit the requirements of the installation.

The spring arms 26 are so assembled and installed that the arms are in their unflexed or unstressed condition when the flaps are partially open as shown in Figure 1. As the flaps tend to close, their adjacent edges tend to approach each other, as shown in Figure 4, because of the angular disposition of their hinge axes. Unless acted upon by some outside force, such as the primary operating means 38, this closing movement is resisted or prevented by flexure of the spring arms 26 to a stressed condition. A similar situation occurs if the flaps tend to open further from the partially open position shown in Figure 1. Thus, if any failure or disconnection occurs in the primary operating means, the flaps will be moved to a partially open position to allow continued engine cooling air flow and prevent damage to the engine by overheating.

At the same time, it will be noted that the spring arms 26 are not permitted any relative movement, except flexure, with respect to the flaps 16. Thus, pivotal movement is prevented by a plurality of rivets 31 and 28 at each point of attachment. This arrangement insures that, if there is any angular movement of a flap with respect to its hinge axis, it must be accompanied by an equal angular movement of all other flaps connected thereto by the connecting means 25.

The flexibility of the arms 25 will thus allow relative lateral movement of adjacent flaps caused by the angular relation of their pivot axes, and yet is rigid in a plane relatively transverse of such pivot axes to assure simultaneous angular movement of the adjacent flaps about their hinge axes. It will be seen that transfer of motion from one flap to an adjacent flap is resisted in shear by the leaf arms 25, while convergence and divergence of adjacent flaps in closing and opening is accompanied by bending, and to a slight extent by twisting, of the arms. As the leaf arms are relatively wide and thin, with their major cross-sectional dimensions extending in the direction of the shearing stresses, the mechanism is relatively rigid in its function of transferring motion between adjacent flaps. The minor cross-sectional dimension of each leaf arm, being in the direction of the bending stresses, allows movement of the flaps with relatively light spring resistance, the degree of such resistance being, of course, dependent upon the thickness and inherent stiffness of the leaf arms.

It will also be noted that the arms 25 in the illustrated embodiment extend outwardly with reference to the flap pivots from their points of connection to the flaps to their points of connection by fasteners 28. By this arrangement motion transmitting loads between adjacent arms 25 at their connection points 28 are loads in shear, rather than torsional loads as would be the case if the connection points were disposed at or adjacent the flap pivot axes.

It is understood that changes may be made in the above described embodiment of the invention without departing from the spirit thereof, except as defined in the appended claims.

I claim:

1. In a cowl flap installation having a pair of flaps with their hinge axes angularly related but in a substantially common plane, a primary operating means for moving at least one of the flaps about its hinge axis, and means for effecting substantially equiangular movement of the flaps about their hinge axes comprising a leaf spring affixed at one end to each flap, the opposite ends of the leaf springs being connected, each leaf spring being arranged with its major cross-sectional dimension substantially in the direction of movement of the springs about said axes, the direction of extent of each leaf spring, from the end thereof affixed to the flap to the opposite end thereof connected to the other leaf spring, being generally away from the hinge axis of the related flap, and the springs being arranged to resist by their resilience hinging movement of the flaps from a partially open position.

2. In a cowl flap installation having a pair of flaps with their hinge axes angularly related but in a substantially common plane, means for effecting substantially equiangular movement of the flaps about their hinge axes comprising a leaf spring affixed at one end to each flap, the opposite ends of the leaf springs being connected, each leaf spring being arranged with its major cross-sectional dimension substantially in its plane of movement with the related flap, and the direction of extent of each leaf spring, from the end thereof affixed to the flap to the opposite end thereof connected to the other leaf spring, being generally away from the hinge axis of the related flap.

3. In a cowl flap installation having a pair of flaps with their hinge axes angularly related but in a substantially common plane, means for effecting substantially equiangular movement of the flaps about their hinge axes comprising a spring unit of substantially V formation with the vertex of the V directed away from the hinge axes and one arm of the V affixed to each of said flaps.

4. In a cowl flap installation having a pair of flaps with their hinge axes angularly related but in a substantially common plane, means for effecting substantially equiangular movement of the flaps about their hinge axes comprising a spring unit of substantially V formation with the vertex of the V directed away from the hinge axes and one arm of the V affixed to each of said flaps, each arm being of elongated cross-section with the major dimension thereof substantially normal to the plane of the V and extending substantially in the plane of movement of the spring unit about the hinge axes.

5. In a cowl flap installation having a pair of flaps with their hinge axes angularly related but in a common plane, means for effecting substantially equiangular movement of the flaps about their hinge axes comprising a spring unit of return directed formation with the arms thereof extending from the bight portion thereof in a direction substantially toward said axes, and the end portions of said arms being affixed to the flaps.

6. In a cowl flap installation having a pair of flaps with their hinge axes angularly related but in a common plane, means for effecting substantially equiangular movement of the flaps about their hinge axes comprising a spring unit of return directed formation with the arms thereof extending from the bight portion thereof in a direction substantially toward said axes, and the end portions of said arms being affixed to the flaps, each arm being of elongated cross-section with the major dimension thereof extending substantially in the plane of movement of the spring unit about the hinge axes.

7. In combination with a pair of hinged elements whose hinge axes are angularly related but in a common plane, means for effecting substantially equiangular movement of the hinged elements about said axes comprising a pair of leaf springs connected to each other at one end and each rigidly connected at the opposite end thereof to a different one of said hinged elements, each leaf spring having its major cross-sectional dimensions substantially in the direction of movement of the springs about the hinge axes, the direction of extent of the springs from the ends thereof that are connected to each other to said opposite ends thereof being in general toward said hinge axis.

LLOYD F. ENGELHARDT.

REFERENCES CITED

The following references are of record in the file of this patent:

UNITED STATES PATENTS

| Number | Name | Date |
|---|---|---|
| 2,049,751 | Shoemaker | Aug. 4, 1936 |
| 2,124,333 | Duff et al. | July 19, 1938 |
| 2,303,732 | Follick | Dec. 1, 1942 |

FOREIGN PATENTS

| Number | Country | Date |
|---|---|---|
| 480,478 | Great Britain | Feb. 23, 1938 |